(12) United States Patent
Ding et al.

(10) Patent No.: US 12,520,144 B2
(45) Date of Patent: Jan. 6, 2026

(54) KEY DISTRIBUTION FROM AN AUTHENTICATION SERVER

(71) Applicant: HEWLETT PACKARD ENTERPRISE DEVELOPMENT LP, Spring, TX (US)

(72) Inventors: Feng Ding, Beijing (CN); Hao Lu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 456 days.

(21) Appl. No.: 18/058,308

(22) Filed: Nov. 23, 2022

(65) Prior Publication Data

US 2024/0171975 A1 May 23, 2024

(51) Int. Cl.
*H04W 12/069* (2021.01)
*H04W 12/041* (2021.01)

(52) U.S. Cl.
CPC ....... *H04W 12/069* (2021.01); *H04W 12/041* (2021.01)

(58) Field of Classification Search
CPC .................................................. H04W 12/069
See application file for complete search history.

(56) References Cited

U.S. PATENT DOCUMENTS

| 7,499,547 | B2 | 3/2009 | Zheng et al. |
| 8,023,478 | B2 | 9/2011 | Cam-Winget et al. |
| 8,050,678 | B2 | 11/2011 | Lin et al. |
| 9,084,111 | B2 | 7/2015 | Narasimhan et al. |
| 9,167,427 | B2 | 10/2015 | Messana et al. |
| 10,034,215 | B2 | 7/2018 | Zhang et al. |
| 10,080,166 | B2 * | 9/2018 | Ganu ................... H04L 41/0866 |
| 10,165,608 | B2 * | 12/2018 | Grayson ............. H04W 12/041 |
| 2013/0196708 | A1 | 8/2013 | Narasimhan et al. |
| 2021/0120602 | A1 | 4/2021 | Huang et al. |
| 2021/0392494 | A1 * | 12/2021 | Huang .................. H04W 12/76 |
| 2022/0353235 | A1 * | 11/2022 | Zhang .................... H04W 8/26 |

OTHER PUBLICATIONS

Calhoun, P., et al., "Control and Provisioning of Wireless Access Points (CAPWAP) Protocol Specification," Network Working Group RFC 5415, Mar. 2009; 155 pages (Year: 2009).*
Akin, Devin. "Robust Security Network (RSN) Fast BSS Transition (FT) White Paper." The CWNP Program, Sep. 2008, Version 2.03. https://www.cwnp.com/uploads/802-11_rsn_ft.pdf. (Year: 2008).*

(Continued)

*Primary Examiner* — Luu T Pham
*Assistant Examiner* — Paul J Skwierawski
(74) *Attorney, Agent, or Firm* — Trop, Pruner & Hu, P.C.

(57) ABSTRACT

In some examples, as part of an authentication process for an electronic device when connecting to a first access point (AP), an authentication server generates a first key of a hierarchy of keys. The authentication server receives a request from a second AP, and generates a second key based on the first key, the second key being part of the hierarchy of keys. In response to the request, the authentication server distributes the second key from the authentication server to the second AP for use in data protection for communications between the second AP and the electronic device after the electronic device has transitioned from the first AP to the second AP.

16 Claims, 4 Drawing Sheets

(56) References Cited

OTHER PUBLICATIONS

Devin, Akin, "Robust Security Network (RSN) Fast BSS Transition (FT)", White Paper, Sep. 2008, 32 pages.
Jason Hintersteiner, "WiFi Fast Roaming, Simplified A primer on the 802.11 wireless protocol and when to implement it.", May 23, 2016, 6 pages.
Rigney et al., "Remote Authentication Dial In User Service (RADIUS)", Request for Comments: 2865, Jun. 2000, 76 pages.
Wikipedia, "IEEE 802.11r-2008", available online at <https://en.wikipedia.org/w/index.php?tittle=IEEE_802.11R-2008&oldid=1074799452>, Mar. 2, 2022, 4 pages.

* cited by examiner

KEY DISTRIBUTION FROM AN AUTHENTICATION SERVER

BACKGROUND

Electronic devices with wireless communication capabilities can communicate over wireless networks. Wireless networks can include network devices to which electronic devices can wirelessly connect so that the electronic devices can communicate with other endpoint devices, which may be connected to wired or wireless networks.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a wireless network can be implemented as a wireless local area network (WLAN), also referred to as a Wi-Fi network. Communications in a WLAN is according to the Institute of Electrical and Electronics Engineers (IEEE) 802.11 standards. A WLAN includes an access point (AP), which is a network device to which electronic devices with wireless communication capabilities can wirelessly connect to communicate with other endpoint devices, which may be wirelessly connected to the same AP, wirelessly connected to another wireless network, or connected to a wired network. Each AP is associated with a given coverage area. When an electronic device is in the coverage area of the AP, the electronic device is able to communicate wirelessly with the AP.

An electronic device performs an association process with an AP to associate with the AP so that the electronic device is able establish a connection with the AP. In conjunction with the association process, the electronic device also performs an authentication procedure with the AP to allow the AP to authenticate the electronic device. The authentication procedure involves messaging between the AP and an authentication server. Once the electronic device is associated and authenticated, the electronic device is ready to perform wireless communications with the AP.

In some cases, an electronic device (referred to as a "station" in WLAN terminology) may transition between different APs. When the electronic device transitions from a first AP (also referred to as a "source AP") to a second AP (also referred to as a "target AP"), the electronic device may have to perform another association and authentication process with the target AP, which can be time consuming and can slow down connection establishment between the electronic device and the target AP and may affect programs running on the electronic device and a remote computing device (e.g., a remote server). For example, a video conference call established between a video conferencing application on the electronic device and a video conference server may drop when the electronic device transitions from the source AP to the target AP.

To address the foregoing issues, a fast transitioning technique has been implemented to allow for quicker transitions of electronic devices between APs. The fast transitioning technique, also referred to as a Fast Basic Service Set (BSS) Transition (FT) protocol, is specified by the IEEE 802.11r standard. The current version of the IEEE 802.11r standard is the IEEE 802.11r-2008 standard. Although reference is made to a specific version of the IEEE 802.11r standard, it is noted that fast transitioning can be described in other versions of the IEEE 802.11r standard, or in other standards.

The FT protocol allows an electronic device to perform an FT reassociation process with the target AP; in this FT reassociation process, a re-authentication of the electronic device with an authentication server does not have to be performed. When the electronic device transitions to the target AP, information from the original association between the electronic device and the source AP is passed to the target AP to provide the electronic device with credentials. As a result, the target AP is made aware that the electronic device has already been approved by the authentication server, and thus does not have to perform the authentication procedure again.

FT involves use of a key hierarchy (referred to as the "FT key hierarchy") that includes multiple levels of keys. For example, the FT key hierarchy includes a first-level key referred to as a Pairwise Master Key (PMK)-R0, a second-level key referred to as a PMK-R1, and a third-level key referred to as a Pairwise Transit Key (PTK) that is used to encrypt data to provide data confidentiality when exchanging data between an electronic device and an AP. The PMK-R1 is derived based on the PMK-R0, and the PTK is derived based on the PMK-R1. The FT protocol specifies that a PMK-R1 key holder (R1KH) should contact a PMK-R0 key holder (R0KH) to obtain PMK-R1 for performing an FT reassociation process. A "key holder" can refer to an entity that is responsible for obtaining, managing, and storing a respective key or keys. The FT protocol does not define the details regarding interactions between the R0KH and the R1 KH. Certain example implementations relating to interactions between the R0KH and the R1 KH can add complexity and/or compromise the security of some keys used in the FT protocol.

In first examples, a target AP is to contact a source AP to derive the PMK-R1. To support this technique, the target AP would have to implement a mechanism to determine a network address (e.g., an Internet Protocol (IP) address) of the R0KH (usually the source AP) based on an identifier of the R0KH (referred to as "R0KH-ID"). In second examples, the source AP can be made aware of all neighboring APs of the source AP, including the identifiers of BSSs (referred to as BSSIDs) and IP addresses of the neighboring APs, so that the source AP can derive and propagate the PMK-R1 to a target AP before an electronic device transitions to the target AP. To support the second examples, each AP would have to maintain a table of IP addresses for each potential target AP.

In both the first and second examples, complexity is added to APs to support the FT protocol.

In third examples, a source AP can hold (store) the PMK-R0 (the first-level key of the FT key hierarchy), and the source AP can transmit the PMK-R0 to all APs in a specified collection of APs in response to an electronic device completing an authentication procedure. In the third examples, the source AP is the R0KH. After the electronic device transitions from the source AP to a target AP, the target AP uses the PMK-R0 broadcast by the source AP to derive the PMK-R1 and then the PTK for the electronic device. The broadcast of the PMK-R0 from the source AP to other APs may not be secure, since the PMK-R0 is exposed over a network between the APs. Also, if there are a large quantity of electronic devices, then the source AP would have to transmit a correspondingly large quantity of PMK-R0s to other APs, which means that such techniques of supporting the FT protocol would not scale well with increasing quantities of electronic devices.

In fourth examples, a source AP (as the R0KH) can send the PMK-R0 to a key management service (which can reside in the cloud, for example). The key management service can derive and send the PMK-R1 based on the PMK-R0 to all neighboring APs of a source AP. The neighboring APs can then derive the PTK for an electronic device based on the PMK-R1 sent by the key management service. Since the PMK-R0 is transferred from the source AP to the key management service, the PMK-R0 is exposed and the security of the PMK-R0 may potentially be compromised.

Additionally, both the third and fourth examples may violate the 802.11r standard, which specifies that the R0KH should not expose the PMK-R0 to other parties.

In accordance with some implementations of the present disclosure, fast transitioning (e.g., the FT protocol of IEEE 802.11r) of an electronic device among APs is supported without exposing a specified key (e.g., the first-level key, PMK-R0, of the FT key hierarchy) outside a holder of the specified key (e.g., the R0KH) and without adding complexity to APs to support fast transitioning. Techniques or mechanisms according to some implementations of the present disclosure employ an authentication server that is the holder of a first-level key (e.g., the PMK-R0). The authentication server derives a second-level key (e.g., the PMK-R1) based on the first-level key (e.g., the PMK-R0). The authentication server sends the second-level key to neighboring APs of a source AP that the electronic device is currently associated with. The second-level key can be sent by the authentication server to the neighboring APs without exposing the first-level key to any AP or to a key management service outside of the authentication server. As a result, the authentication server as the holder of the first-level key is able to protect the security of the first-level key, such that a malicious actor would not be able to gain access to the first-level key.

In a WLAN, an electronic device transitioning between APs refers to the electronic device transitioning between basic service sets (BSSs) that share a service set identifier (SSID). A BSS is a group of wireless devices (including an AP and one or more electronic devices associated with the AP), and the BSS is identified by a BSS identifier (BSSID). An SSID is a name of a WLAN.

Although the present discussion refers to the FT protocol according to IEEE 802.11r, it is noted that in other examples, fast transitioning techniques can be applied in the context of other types of wireless networks. An "access point" or "AP" can refer to any type of network device used in a wireless network to perform wireless communications with electronic devices. As examples, an AP can refer to an AP used in a WLAN, a base station used in a cellular network, or any other type of network device used in another type of wireless network.

Figure 1:
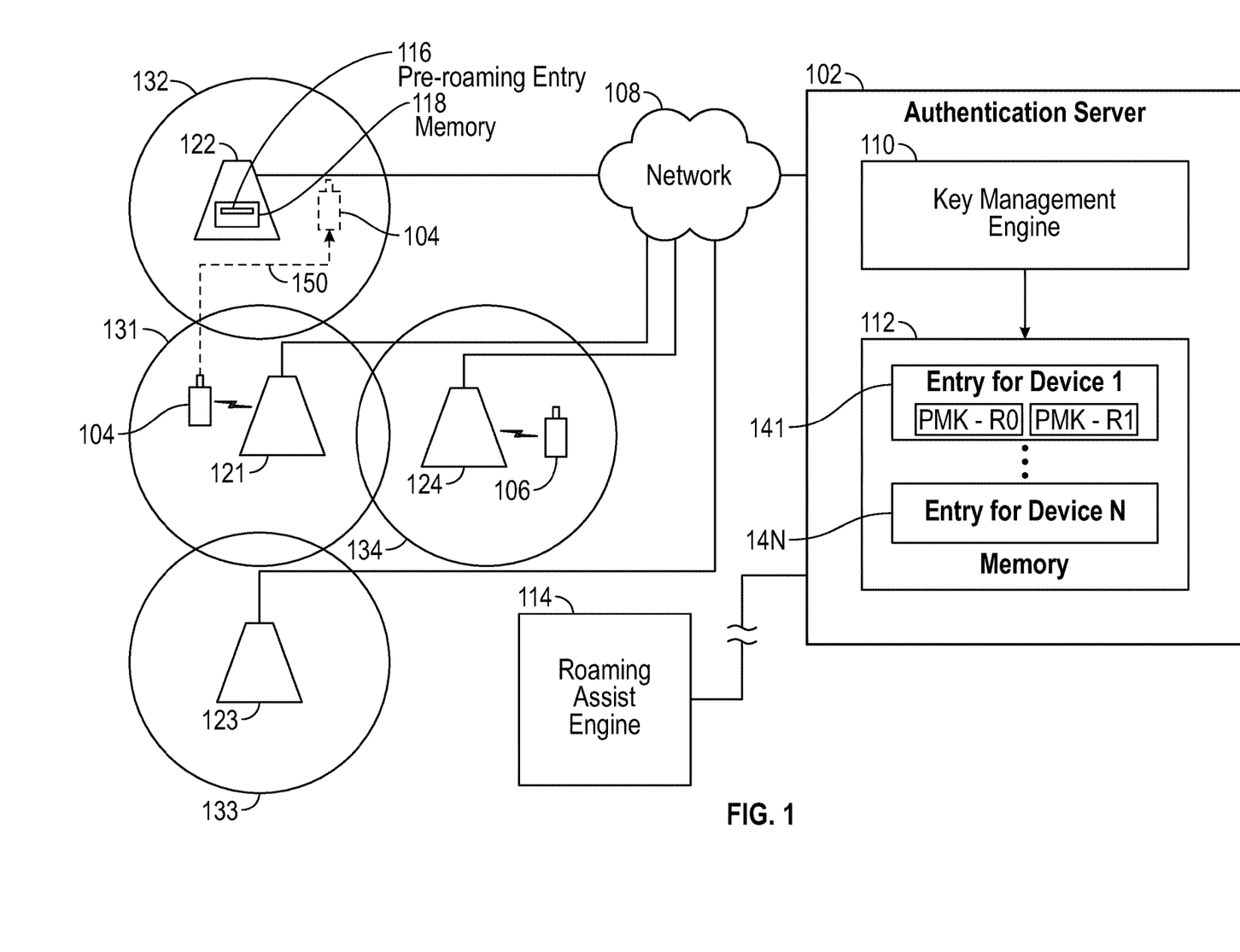
FIG. 1 is a block diagram of an arrangement that includes an electronic device, access point (APs), an authentication server, and a roaming assist engine, in accordance with some examples.

FIG. 1 is a block diagram of an example arrangement that includes a number of APs 121, 122, 123, and 124, and an authentication server 102 according to some examples of the present disclosure. Although FIG. 1 shows an example with four APs, in other examples, a different quantity of APs may be present.

Each AP is associated with a respective coverage area, where a "coverage area" refers to a geographic region corresponding to the range of a wireless transceiver of the AP. In the example of FIG. 1, the APs 121 to 124 have respective coverage areas 131 to 134.

The authentication server 102 may reside in the cloud, or alternatively, the authentication server 102 may be deployed on a hardware platform in the network.

FIG. 1 shows an electronic device 104 in the coverage area 131 of the AP 121, and an electronic device 106 in the coverage area 134 of the AP 124. The electronic device 104 is associated with the AP 121, and the electronic device 106 is associated with the AP 124. In further examples, there may be additional electronic devices that are associated with respective APs 121 to 124.

The APs 121 to 124 are coupled through over a network 108 to the authentication server 102. The network 108 can include a local area network (LAN), a wide area network (WAN), a public network, and so forth.

The authentication server 102 is used to perform authentication of electronic devices, including the electronic devices 104 and 106. In the context of authentication procedures performed with the authentication server 102, electronic devices are referred to as client devices. Examples of electronic devices can include any or some combination of the following: a notebook computer, a tablet computer, a desktop computer, a smartphone, a vehicle, a user-wearable device, and so forth.

In some examples, the authentication server 102 is a Remote Authentication Dial In User Service (RADIUS) server that can perform authentications of client devices (e.g., the electronic devices 104 and 106) according to the RADIUS protocol. A version of the RADIUS protocol is described in Request for Comments (RFC) 2865, entitled "Remote Authentication Dial In User Service (RADIUS)," dated June 2000. In other examples, the authentication server 102 can perform authentications of client devices according to other protocols, whether standardized, open-source, or proprietary.

The example arrangement of FIG. 1 further includes a roaming assist engine 114, which is an entity that is able to prepare neighboring APs of the AP 121 to support fast transitioning of the electronic device 104. In some examples, the roaming assist engine 114 can be implemented using one or more computers that is (are) separate from the APs and the authentication server 102. In other examples, the roaming assist engine 114 can be part of one or more APs and/or the authentication server 102.

Figure 2:
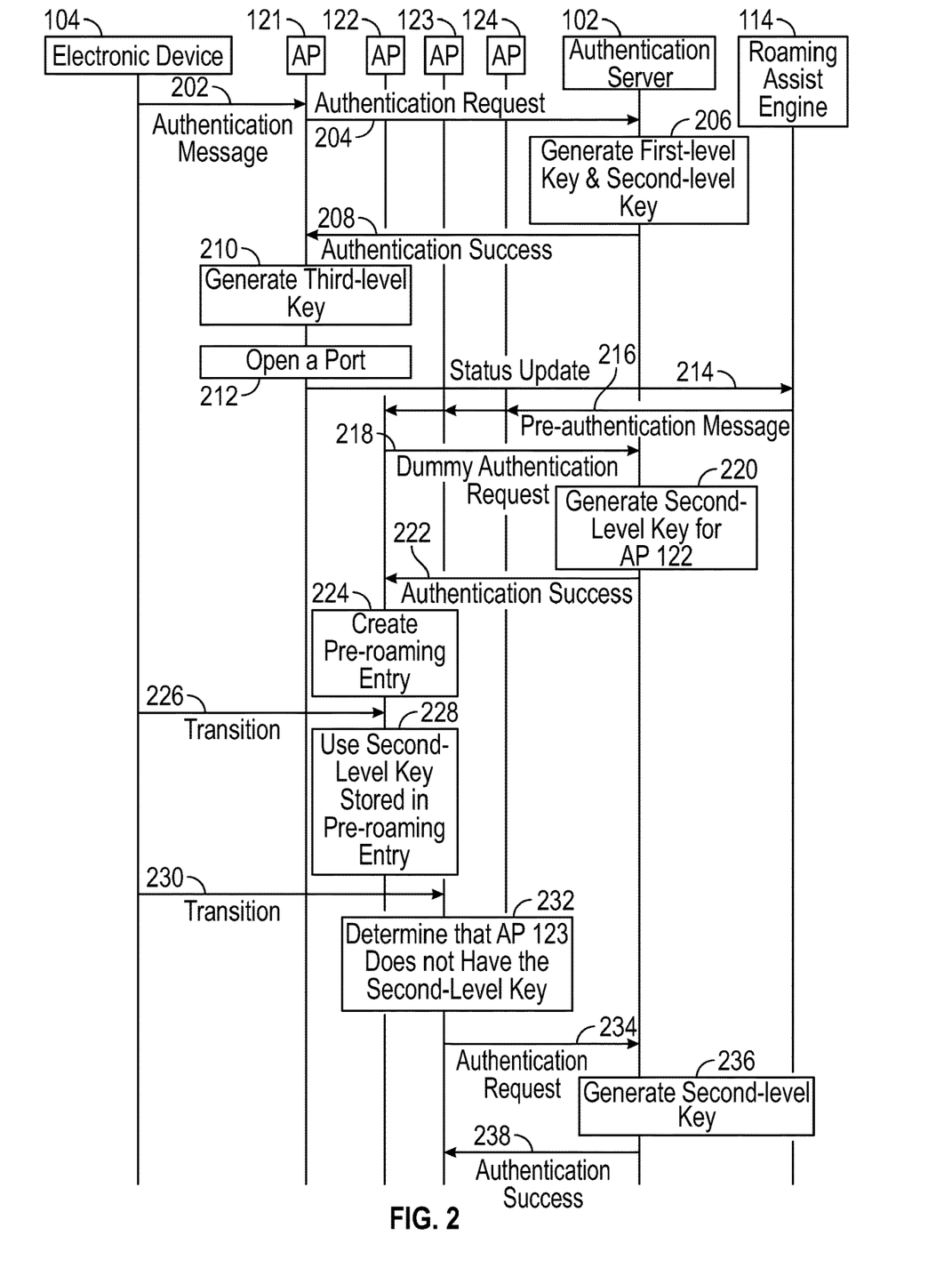
FIG. 2 is a flow diagram of a process performed by an electronic device, APs, an authentication server, and a roaming assist engine, according to some examples.

The following refers to both FIGS. 1 and 2. FIG. 2 is a flow diagram of tasks performed by the electronic device 104, the APs 121 to 124, and the authentication server 102, in accordance with some examples of the present disclosure.

In some examples, an electronic device attempting to connect to an AP can initiate an authentication process with the AP according to IEEE 802.1X, which is an IEEE standard for Port-based Network Access Control (PNAC) that provides protected authentication for secure network access by electronic devices. In other examples, other types of authentication processes may be initiated by an electronic device with an AP. In response to the authentication process initiated by the electronic device, the AP initiates an authentication procedure with the authentication server 102. In some examples, the authentication procedure is a RADIUS authentication procedure, and the authentication server 102 is a RADIUS server.

The authentication server 102 includes a key management engine 110 that manages distribution of certain keys of a key hierarchy in a secure manner, according to some examples of the present disclosure. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The key management engine 110 is able to generate a first-level key of a key hierarchy that is used in fast transitioning of an electronic device between APs. In some examples, the first-level key is the PMK-R0 of the FT key hierarchy. In some examples, the key management engine 110 can generate the PMK-R0 for a respective electronic device based on a master session key (MSK) and other information. The MSK is produced as part of the authentication procedure performed at the authentication server 102 in response to the respective electronic device initiating an authentication process (e.g., an IEEE 802.1X authentication).

Once the first-level key is generated by the key management engine 110, the key management engine 110 can generate a second-level key of the key hierarchy for the respective electronic device. In some examples, the second-level key is the PMK-R1 of the FT key hierarchy. Further details regarding how a PMK-R0 and a PMK-R1 are generated are described in IEEE 802.11r.

As depicted in FIG. 1, the authentication server 102 includes a memory 112, which can be implemented using a collection of memory devices (a single memory device or multiple memory devices). Examples of memory devices can include any or some combination of the following: a dynamic random access memory (DRAM) device, a static random access memory (SRAM) device, a flash memory device, and so forth.

The memory 112 can store authenticated device entries 141 to 14N (N 1) for respective electronic devices that have been authenticated by the authentication server 102. Each authenticated device entry can contain various information for a respective electronic device, including keys of the FT key hierarchy. For example, the authenticated device entry 141 includes a PMK-R0 and a PMK-R1 for the electronic device 104, and the authenticated device entry 14N includes a PMK-R0 and a PMK-R1 for the electronic device 106. The memory 112 can store other authenticated device entries for other electronic devices. In addition to keys of a key hierarchy used for fast transitioning, the authenticated device entries 141 to 14N can store other information for corresponding electronic devices.

The following refers to both FIGS. 1 and 2. FIG. 2 is a flow diagram of tasks performed by the electronic device 104, the APs 121 to 124, and the authentication server 102, in accordance with some examples of the present disclosure.

In some examples, assuming that the electronic device 104 is in the coverage area 131 of the AP 121, to connect to the AP 121, the electronic device 104 can initiate an authentication process with the AP 121, such as according to IEEE 802.1X. In some examples, the electronic device 104 sends (at 202) a message to initiate the authentication process.

In response to the message from the electronic device 104, the AP 121 sends (at 204) an authentication request to the authentication server 102. In some examples, the authentication request is a RADIUS Access-Request message that initiates a RADIUS authentication procedure at the authentication server 102 (which is a RADIUS server in such examples).

The key management engine 110 of the authentication server 102 generates (at 206) a first-level key of a key hierarchy used for fast transitioning of the electronic device 104 (e.g., PMK-R0), and a second-level key of the key hierarchy (e.g., PMK-R1). The generated first-level and second-level keys can be stored by the key management engine 110 in the authenticated device entry 141 in the memory 112 of the authentication server 102.

In response to the authentication request (204) from the AP 121, the authentication server 102 sends (at 208) an authentication success message to the AP 121 if the authentication server 102 is able to successfully authenticate the electronic device 104. In some examples, the authentication success message is a message that indicates that the electronic device 104 has been successfully authenticated. The authentication success message can be a RADIUS Access-Accept message in some examples.

The authentication success message includes the second-level key (e.g., PMK-R1) generated by the authentication server 102, among other information relating to the authentication procedure at the authentication server 102. In this manner, the authentication server 102 is able to distribute the second-level key to the AP 121. Since the communications channel between the AP 121 and the authentication server 102 is a secure channel used for authentication procedures, the communication of the second-level key is secure. As an example, communications between APs and the authentication server 102 can be protected using the RADIUS Security (RadSec) protocol, which transports RADIUS messages over a Transmission Control Protocol (TCP) transport that uses Transport Layer Security (TLS). In other examples, communications between APs and the authentication server 102 can be protected using other security protocols, whether standardized, open-source, or proprietary.

In some examples according to the present disclosure, the authentication server 102 is the holder of the first-level key (e.g., the R0KH). As the holder of the first-level key, the authentication server 102 does not transmit the first-level key to another entity, thereby ensuring the integrity of the first-level key and complying with standards (e.g., the IEEE 802.11r standard) that specifies that the first-level key is not to be shared by the first-level key holder with other entities.

The FT architecture according to IEEE 802.11r includes the following types of key holders: R0KH, R1KH, S0KH, and S1KH. The R0KH is a component of robust security network association (RSNA) key management of an authenticator that is authorized to derive and hold the PMK-R0, derive one or more PMK-R1s based on the PMK-R0, and distribute the one or more PMK-R1s to R1 KHs. The authenticator is a device in a network that is used in performing an authentication of an electronic device (a client device that is also referred to as a "supplicant"). The R1 KH is a component of RSNA key management of an authenticator that receives a PMK-R1 from the R0KH, holds the PMK-R1, and derives one or more PTKs.

In the context of some examples of the present disclosure, the authentication server 102 plays the role of the R0KH, and an AP plays the role of R1 KH. RSNA refers to a protocol that governs the establishment of secure communications between electronic devices and APs, and the generation of transient keys for data confidentiality (e.g., the PTKs of the FT key hierarchy). RSNA is defined by the IEEE 802.11i standard.

The SOKH is a component of RSNA key management of a supplicant (an electronic or client device) that derives and holds the PMK-R0, derives one or more PMK-R1s, and provides the one or more PMK-R1s to the SIKH. For example, the electronic device can negotiate the PMK-R0 with the authentication server 102 when the electronic device first connects to an AP. The SIKH is a component of RSNA key management of the supplicant that receives a PMK-R1 from the SOKH, holds the PMK-R1, and derives one or more PTKs. In some examples, the electronic device can also derive the PMK-R1 based on the PMK-R0 derived by the electronic device. Based on the PMK-R1 generated at the electronic device, the electronic device can mutually produce a third-level key (e.g., PTK) with the connected AP.

The authentication server 102 shares the second-level key with the AP 121 for use by the AP 121 in generating (at 210) the third-level key of the key hierarchy (e.g., PTK based on the PMK-R1). The AP 121 can mutually derive the PTK with the electronic device 104 since both the AP 121 and the electronic device 104 have the same information (e.g., the PMK-R1). Details regarding how the PTK can be derived based on the PMK-R1 are described in the IEEE 802.11r standard. The third-level key (e.g., the PTK) is used to encrypt data exchanged between the AP 121 and the electronic device 104.

The AP 121 further opens (at 212) a port of the AP 121 for access by the electronic device 104. The port of the AP 121 that is opened is a logical port that can be transitioned between a block state and an unblock state. In the block state of the logical port, an electronic device is unable to communicate using the logical port. When opened, the logical port is transitioned to the unblock state, so that an electronic device is unable to communicate using the logical port. At this stage, the authentication process (e.g., the IEEE 802.1X authentication process) is complete, and the electronic device 104 is able to access the opened port (port in the unblock state) of the AP 121 for data communications.

In some examples of the present disclosure, the AP 121 (which is the AP that the electronic device 104 is connected to) sends (at 214) a status update message to the roaming assist engine 114. The status update message sent by the AP 121 to the roaming assist engine 114 can include any or some combination of the following information: a network address (e.g., a MAC address) of the electronic device 104, an SSID associated with the AP 121, further information regarding the electronic device 104 and the AP 121, and so forth.

Note that in some examples of the present disclosure, the status update message sent by the AP 121 to the roaming assist engine 114 does not include the first-level and second-level keys (e.g., PMK-R0 and PMK-R1).

The roaming assist engine 114 sends (at 216) a pre-authentication message to all neighboring APs of the AP 121. The neighboring APs of the AP 121 can include the APs 122 to 124. In some examples, the pre-authentication message can be multicast to the neighboring APs. In other examples, multiple instances of the pre-authentication message can be unicast to the neighboring APs.

The roaming assist engine 114 can determine the neighboring APs of the AP 121 by querying another service that is able to detect neighboring APs of any AP by measuring signals transmitted by the APs and determining which APs are within range of other APs. In other examples, the roaming assist engine 114 can itself make the determination of the neighboring APs.

The pre-authentication message sent by the roaming assist engine 114 to the neighboring APs can include the network address (e.g., MAC address) of the electronic device 104 and the SSID to which the electronic device 104 is currently associated. The pre-authentication message is sent to the neighboring APs so that the neighboring APs can perform tasks to prepare the neighboring APs to support fast transitioning of the electronic device 104 in case the electronic device 104 were to transition to any of the neighboring APs.

In response to the pre-authentication message (216) from the roaming assist engine 114, a respective iteration of tasks 218-224 of FIG. 2 is performed for each respective neighboring AP of the neighboring APs 122 to 124. FIG. 2 depicts the tasks 218-224 as being performed with respect to the neighboring AP 122. Similar tasks are performed with respect to each of the other neighboring APs 123 and 124.

The neighboring AP 122 sends (at 218) a "dummy" authentication request to the authentication server 102. The authentication request sent by the respective neighboring AP to the authentication server 102 is a "dummy" request in the sense that the request is initiated in response to a message from another AP, rather than a message from an electronic device (i.e., a client device). The "dummy" authentication request can be a RADIUS Access-Request message in some examples.

The authentication request from the neighboring AP 122 can contain the following information in some examples: an R1 KH-ID and an 51 KH-ID. As noted further above, R1 KH is the PMK-R1 key holder, and SIKH is the PMK-S1 key holder. R1KH-ID refers to an identifier of the R1 KH (in this case the neighboring AP 122), and 51 KH-ID refers to an identifier of the SIKH. In some examples, the R1 KH-ID can be the BSSID of the neighboring AP 122, which in some examples can be a MAC address of the neighboring AP 122. In some examples, the 51KH-ID can be a MAC address of the electronic device 104 that was communicated to the neighboring AP 122 in the pre-authentication message (216) from the AP 121. In examples where the authentication request from the neighboring AP 122 is a RADIUS Access-Accept message, the R1 KH-ID and the 51 KH-ID are contained in the following respective attributes of the RADIUS Access-Accept message: Called-Station-Id and Calling-Station-Id.

In response to receiving the authentication request (218) from the neighboring AP 122, the authentication server 102 (acting in its role as the R0KH) generates (at 220) the second-level key (e.g., PMK-R1) for the neighboring AP 122 based on the first-level key (e.g., PMK-R0). Note that different PMK-R1s would be computed for different neighboring APs. The PMK-R0 was generated (at 206) by the authentication server 102 and stored in the authenticated device entry 141 in the memory 112 of the authentication server 102. In some examples, the PMK-R0 is generated (at 206) by the authentication server 102 based on the MSK as well as other information, including the SSID, the R0KH-ID (the identifier of the authentication server 102, such as its MAC address), the SOKH-ID (the identifier of the electronic device 104, such as its MAC address), and further information as specified by IEEE 802.11r.

As an example, according to IEEE 802.11r, PMK-R1 is computed according to PMK-R1=KDF-256(PMK-R0, "FT-R1", R1 KH-ID II S1KH-ID), where "KDF-256" represents a key derivation function that generates a 256-bit output, "FT-R1" is a specified string, and "II" is a concatenation operator.

According to IEEE 802.11r, PMK-R0 is computed according to PMK-R0=L(R0-Key-Data, 0, 256), where "L(S, F, N)" represents bits F to F+N−1 of a bit string S starting from the left, as defined by IEEE 802.11, and R0-Key-Data=KDF-384(XXKey, "FT-R0", SSIDlength||SSID||MDID||R0KHlength||R0KH-ID||S0KH-ID). KDF-384" represents a key derivation function that generates a 384-bit output, "FT-R0" is a specified string, XXKey can include a portion of the MSK derived from the IEEE 802.1X authentication, SSIDlength represents a length of the SSID, MDID represents a Mobility Domain Identifier, and R0KHlength represents the length of R0KH-ID.

Although specific equations are set forth for deriving PMK-R0 and PMK-R1, it is noted that in other examples (such as according to different fast transitioning standards), the PMK-R0 and PMK-R1 can be generated in a different way.

The authentication server 102 generates (at 220) the PMK-R1 for the neighboring AP 122 based on the PMK-R0 retrieved from the authenticated device entry 141 as well as other information, including the R1KH-ID (the identifier of the respective neighboring AP, such as its MAC address), the S1KH-ID (the identifier of the electronic device 104, such as its MAC address), and further information as specified by IEEE 802.11r.

In response to the authentication request (218) from the neighboring AP 122, the authentication server 102 sends (at 222) an authentication success message (e.g., a RADIUS Access-Accept message) to the neighboring AP 122. The authentication success message contains the PMK-R1 for the neighboring AP 122.

The neighboring AP 122 obtains the PMK-R1 from the authentication success message (222), and creates (at 224) a pre-roaming entry for the electronic device 104. FIG. 1 shows an example pre-roaming entry 116 stored in a memory 118 of the AP 122, which is a neighboring AP of the AP 121. The temporary pre-roaming entry 116 contains the PMK-R1 received in the authentication success message sent (at 222) from the authentication server 102 to the neighboring AP 122.

As noted above, tasks 218-224 can be re-iterated with respect to each of the other neighboring APs 123 and 124.

Subsequently, when the electronic device 104 transitions (at 226) from the AP 121 to the AP 122 according to a fast transitioning procedure (as indicated by an arrow 150 in FIG. 1), the fast transition of the electronic device 104 can bypass an authentication process (e.g., the IEEE 802.1X process). The fast transitioning procedure may be initiated by the electronic device 104 by sending an FT authentication request according to the FT protocol (IEEE 802.11r) from the electronic device 104 to the AP 122.

In the fast transitioning procedure, the neighboring AP 122 can use (at 228) the second-level key (e.g., PMK-R1) stored in pre-roaming entry 116 to mutually derive a PTK with the electronic device 104 for use in protecting communications with the electronic device 104.

In further examples, when the electronic device 104 transitions (at 230) to another AP 123 (either from the AP 121 or from another AP such as 122 or 124) according to a fast transitioning procedure (e.g., the electronic device 104 sends an FT authentication request to the AP 124), the AP 123 may not have the PMK-R1 for some reason, such as due to a fault at the AP 123 or due to the authentication procedure between the AP 123 and the authentication server 102 not completely successfully.

In such further examples, a fallback mechanism can be implemented by the AP 123 in response to the AP 123 determining (at 232) that the AP 123 does not have the second-level key (e.g., PMK-R1) for the electronic device 104. In response to the FT authentication request and determining that the AP 123 does not have the second-level key for the electronic device 104, the AP 123 sends (at 234) an authentication request (e.g., a RADIUS Access-Request message) to the authentication server 102. As an example, the Access-Request message can carry the R1 KH-ID and the S1KH-ID in respective Called-Station-Id and Calling-Station-Id RADIUS attributes.

In response to the authentication request (234), the authentication server 102 generates (at 236) the second-level key (e.g., PMK-R1) for the AP 123, and sends (at 238) the second-level key (e.g., PMK-R1) in an authentication success message (e.g., a RADIUS Access-Accept message) to the AP 124.

In response to receiving the second-level key (e.g., PMK-R1) sent (at 238), the AP 124 can use the second-level key (e.g., PMK-R1) to generate a PTK.

In accordance with some examples of the present disclosure, the first-level key of a key hierarchy for fast transitioning of an electronic device is protected against unauthorized access since the first-level key is not shared by the first-level key holder to another entity. Moreover, mechanisms according to some examples of the present disclosure can scale well since the mechanisms are not broadcasting a large quantity of first-level keys for corresponding electronic devices. Moreover, security for second-level keys exchanged between APs and the authentication server is enhanced since communication channels between the APs and the authentication server are protected by a security mechanism such as the RadSec protocol. Additionally, mechanisms according to some examples of the present disclosure are able to support fast transitioning of electronic devices between APs since delays associated with generation of second-level keys at APs can be reduced.

Figure 3:
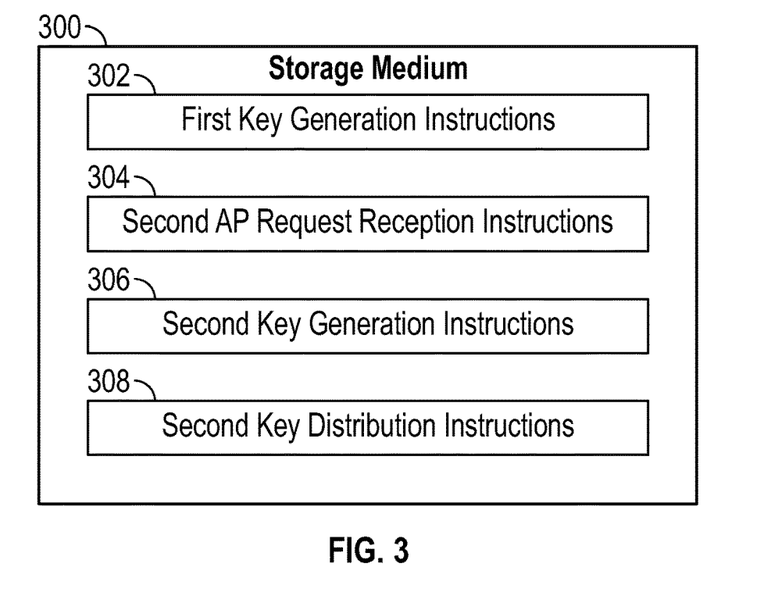
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include a computer or multiple computers.

The machine-readable instructions include first key generation instructions 302 to, as part of an authentication process for an electronic device when connecting to a first AP, generate, at an authentication server (e.g., 102 in FIG. 1), a first key (e.g., PMK-R0) of a hierarchy of keys. The electronic device can initiate an authentication process (e.g., an IEEE 802.1X process) with the first AP. In response, the first AP sends an authentication request (e.g., a RADIUS Access-Request message) to the authentication server in response to the authentication process initiated by the electronic device.

The machine-readable instructions include second AP request reception instructions 304 to receive, at the authentication server, a request from a second AP to which the electronic device may transition. In some examples, the request from the second AP is an authentication request (e.g., the "dummy" authentication request sent at 218 in FIG. 2). The authentication request from the second AP can be in response to a pre-authentication message from a roaming assist engine (e.g., 114 in FIG. 1).

The machine-readable instructions include second key generation instructions 306 to generate, at the authentication server, a second key (e.g., PMK-R1) based on the first key. The second key is part of the hierarchy of keys. The second key generated by the authentication server is for the second AP. The second key can be stored at the second AP prior to the electronic device transitioning to the second AP.

The machine-readable instructions include second key distribution instructions 308 to, in response to the request from the second AP, distribute the second key from the authentication server to the second AP for use in data protection for communications between the second AP and the electronic device after the electronic device has transitioned from the first AP to the second AP. For example, the second AP can use the distributed second key to derive a third key (e.g., PTK) that is used to encrypt data exchanged between the second AP and the electronic device.

In some examples, the authentication server can send the second key to the second AP without the first key being sent to the second AP or a key management service separate from the authentication server. Note that the authentication server includes a key management engine (e.g., 110 in FIG. 1) so that the authentication server would not have to send the first key (e.g., PMK-R0) to an external key management service, which would be insecure.

In some examples, a roaming assist engine (e.g., 114 in FIG. 1) receives a first message including information relating to the electronic device and the first AP. The first message may be the status update message (214) of FIG. 2. In response to the first message, the roaming assist engine sends a second message to neighboring APs of the first AP. The second message can be the pre-authentication message (216) of FIG. 2.

In some examples, the second message is to prepare the neighboring APs to support fast transitioning of the electronic device. In some examples, the information included in the first message includes a network address of the electronic device and an SSID of a wireless network including the first AP.

Figure 4:
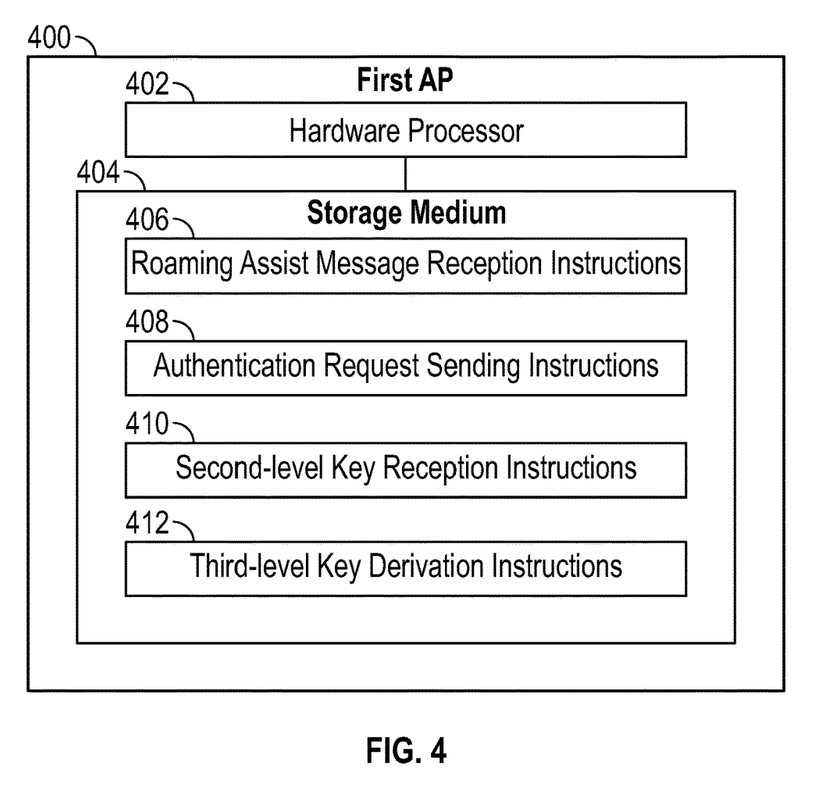
FIG. 4 is a block diagram of an AP according to some examples.

FIG. 4 is a block diagram of a first AP 400 according to some examples. The first AP 400 may be a neighboring AP of a source AP (e.g., 121 in FIG. 1) to which an electronic device is connected. The first AP 400 may be a target AP (e.g., one of the neighboring APs of FIG. 1) to which the electronic device can transition from the source AP.

The first AP 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The first AP 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include roaming assist message reception instructions 406 to receive, from a roaming assist engine, a message including information of an electronic device and an identifier of a wireless network including a second AP that the electronic device is currently connected to. The second AP can be the source AP. The message can include a pre-authentication message (e.g., 216 in FIG. 2) sent to neighboring APs of the second AP to prepare the neighboring APs for fast transitioning of the electronic device.

The machine-readable instructions in the storage medium 404 include authentication request sending instructions 408 to, in response to the message, send an authentication request to an authentication server. The authentication request can be a "dummy" authentication request (e.g., 218 in FIG. 2). The authentication server an be a RADIUS server.

The machine-readable instructions in the storage medium 404 include second-level key reception instructions 410 to receive, at the first AP from the authentication server responsive to the authentication request, a second-level key derived by the authentication server based on a first-level key. The second-level key can be the PMK-R1 key of the FT key hierarchy, and the first-level key can be the PMK-R0 key of the FT key hierarchy.

The machine-readable instructions in the storage medium 404 include third-level key derivation instructions 412 to, responsive to the electronic device transitioning to the first AP, derive a third-level key based on the second-level key. The third-level key is useable to protect data between the first AP and the electronic device. For example, the third-level key is an PTK.

Figure 5:
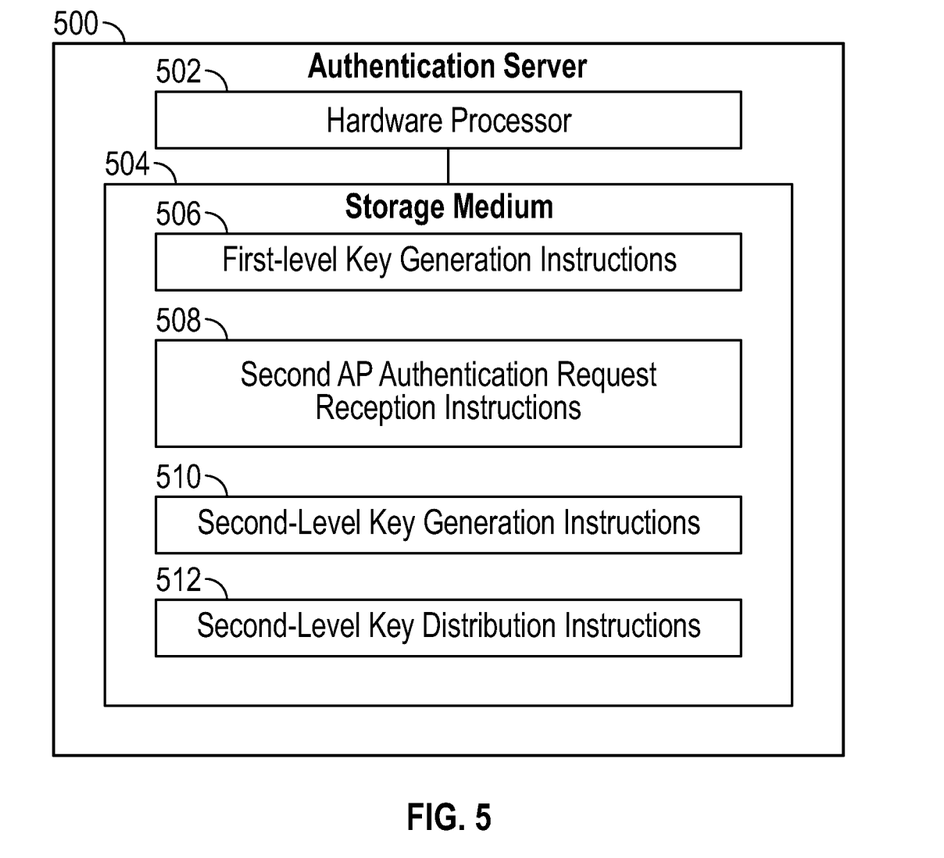
FIG. 5 is a flow diagram of an authentication server according to some examples.

FIG. 5 is a block diagram of an authentication server 500 according to some examples. The authentication server 500 may be the authentication server 102 of FIG. 1, for example.

The authentication server 500 includes a hardware processor 502 (or multiple hardware processors). The authentication server 500 includes a storage medium 504 storing machine-readable instructions executable on the hardware processor 502 to perform various tasks.

The machine-readable instructions in the storage medium 504 include first-level key generation instructions 506 to, as part of an authentication process for an electronic device when connecting to a first AP, generate a first-level key of a hierarchy of keys associated with fast transitioning of the electronic device. The first-level key can be the PMK-R0, for example.

The machine-readable instructions in the storage medium 504 include second AP authentication request reception instructions 508 to receive, at the authentication server, an authentication request from a second AP. The authentication request from the second AP is responsive to a pre-authentication message for preparing the second AP to support the fast transitioning of the electronic device.

The machine-readable instructions in the storage medium 504 include second-level key generation instructions 510 to generate, at the authentication server, a second-level key for the second AP based on the first level key. The second-level key is part of the hierarchy of keys. The second-level key can be the PMK-R1, for example.

The machine-readable instructions in the storage medium 504 include second-level key distribution instructions 512 to, in response to the authentication request, distribute the second-level key from the authentication server to the second AP for use in data protection for communications between the second AP and the electronic device after the electronic device has transitioned from the first AP to the second AP. The distribution of the second-level key from the authentication server to the second AP is prior to the electronic device transitioning to the second AP.

In the present disclosure, use of the term "a," "an," or "the" is intended to include the plural forms as well, unless the context clearly indicates otherwise. Also, the term "includes," "including," "comprises," "comprising,"

"have," or "having" when used in this disclosure specifies the presence of the stated elements, but do not preclude the presence or addition of other elements.

A storage medium (e.g., 300 in FIG. 3, or 404 in FIG. 4, or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a first access point (AP) to:
   receive, from a roaming assist engine, a pre-authentication message comprising information of an electronic device and an identifier of a wireless network comprising a second AP that the electronic device is currently connected to, the pre-authentication message comprising a multicast message sent by the roaming assist engine to a plurality of APs including the first AP, after an authentication of the electronic device has been performed by an authentication server for the electronic device currently connected to the second AP, the authentication of the electronic device comprising generating a first-level key;
   in response to the pre-authentication message, send an authentication request to the authentication server;
   receive, at the first AP from the authentication server responsive to the authentication request, a second-level key derived by the authentication server based on the first-level key;
   store the second-level key received from the authentication server in a pre-roaming entry of a memory of the first AP;
   responsive to the electronic device transitioning to the first AP, retrieve the second-level key from the pre-roaming entry and derive a third-level key based on the second-level key useable to protect data between the first AP and the electronic device, wherein the first-level key, the second-level key, and the third-level key are part of a hierarchy of keys for fast transitioning of the electronic device;
   in response to a transition of a further electronic device to the first AP from another AP:
      determine whether the first AP has a second-level key for the further electronic device,
      in response to determining that the first AP does not have the second-level key for the further electronic device, send a further authentication request from the first AP to the authentication server, and
      receive, at the first AP, the second-level key for the further electronic device from the authentication server in response to the further authentication request.

2. The non-transitory machine-readable storage medium of claim 1, wherein the plurality of APs are neighboring APs of the second AP.

3. The non-transitory machine-readable storage medium of claim 1, wherein the third-level key is to encrypt data between the second AP and the electronic device.

4. The non-transitory machine-readable storage medium of claim 1, wherein the authentication server comprises a Remote Authentication Dial In User Service (RADIUS) server.

5. The non-transitory machine-readable storage medium of claim 1, wherein the authentication request sent from the first AP to the authentication server comprises an identifier of the first AP and an identifier of the electronic device.

6. The non-transitory machine-readable storage medium of claim 1, wherein the multicast message is to prepare the plurality of APs to support the fast transitioning of the electronic device.

7. The non-transitory machine-readable storage medium of claim 1, wherein the information of the electronic device in the pre-authentication message comprises a network address of the electronic device, and the identifier of the wireless network in the pre-authentication message comprises a service set identifier (SSID) of the wireless network.

8. The non-transitory machine-readable storage medium of claim 1, wherein the second-level key is received from the authentication server at the first AP prior to the electronic device transitioning to the first AP.

9. A first access point (AP) comprising:
   a hardware processor; and
   a non-transitory storage medium comprising instructions executable on the hardware processor to:
      receive, from a roaming assist engine, a pre-authentication message comprising information of an electronic device and an identifier of a wireless network comprising a second AP that the electronic device is currently connected to, the pre-authentication message comprising a multicast message sent by the roaming assist engine to a plurality of APs including the first AP, after an authentication of the electronic device has been performed by an authentication server for the electronic device currently connected to the second AP, the authentication of the electronic device comprising generating a first-level key;
      in response to the pre-authentication message, send an authentication request to the authentication server;
      receive, at the first AP from the authentication server responsive to the authentication request, a second-level key derived by the authentication server based on the first-level key;
      store the second-level key received from the authentication server in a pre-roaming entry of a memory of the first AP;
      responsive to the electronic device transitioning to the first AP, retrieve the second-level key from the pre-roaming entry and derive a third-level key based on the second-level key useable to protect data between the first AP and the electronic device, wherein the first-level key, the second-level key, and the third-level key are part of a hierarchy of keys for fast transitioning of the electronic device;

in response to a transition of a further electronic device to the first AP from another AP:
determine whether the first AP has a second-level key for the further electronic device,
in response to determining that the first AP does not have the second-level key for the further electronic device, send a further authentication request from the first AP to the authentication server, and
receive, at the first AP, the second-level key for the further electronic device from the authentication server in response to the further authentication request.

10. The first AP of claim 9, wherein the authentication request sent from the first AP to the authentication server comprises an identifier of the first AP and an identifier of the electronic device.

11. The first AP of claim 9, wherein the plurality of APs are neighboring APs of the second AP.

12. The first AP of claim 9, wherein the information of the electronic device in the pre-authentication message comprises a network address of the electronic device, and the identifier of the wireless network in the pre-authentication message comprises a service set identifier (SSID) of the wireless network.

13. A method comprising:
receiving, at a first access point (AP) from a roaming assist engine, a pre-authentication message comprising information of an electronic device and an identifier of a wireless network comprising a second AP that the electronic device is currently connected to, the pre-authentication message comprising a multicast message sent by the roaming assist engine to a plurality of APs including the first AP, after an authentication of the electronic device has been performed by an authentication server for the electronic device currently connected to the second AP, the authentication of the electronic device comprising generating a first-level key;

in response to the pre-authentication message, sending, by the first AP, an authentication request to the authentication server;
receiving, at the first AP from the authentication server responsive to the authentication request, a second-level key derived by the authentication server based on the first-level key;
storing the second-level key received from the authentication server in a pre-roaming entry of a memory of the first AP;
responsive to the electronic device transitioning to the first AP, retrieving, by the first AP, the second-level key from the pre-roaming entry and deriving a third-level key based on the second-level key useable to protect data between the first AP and the electronic device, wherein the first-level key, the second-level key, and the third-level key are part of a hierarchy of keys for fast transitioning of the electronic device;
in response to a transition of a further electronic device to the first AP from another AP:
determining whether the first AP has a second-level key for the further electronic device,
in response to determining that the first AP does not have the second-level key for the further electronic device, sending a further authentication request from the first AP to the authentication server, and
receiving, at the first AP, the second-level key for the further electronic device from the authentication server in response to the further authentication request.

14. The method of claim 13, wherein the authentication request sent from the first AP to the authentication server comprises an identifier of the first AP and an identifier of the electronic device.

15. The method of claim 13, wherein the second-level key is received from the authentication server at the first AP prior to the electronic device transitioning to the first AP.

16. The method of claim 13, wherein the pre-authentication message comprises a network address of the electronic device and a service set identifier (SSID) of the wireless network.

* * * * *